May 29, 1951 — B. W. KING, JR., ET AL — 2,555,272
OPAQUING AGENTS FOR VITREOUS ENAMELS AND PROCESS OF MAKING
Filed April 6, 1949 — 2 Sheets-Sheet 1

INVENTORS.
B. W. King Jr.
L. C. Baumhardt
BY
William H Brown

Patented May 29, 1951

2,555,272

UNITED STATES PATENT OFFICE 2,555,272

OPAQUING AGENTS FOR VITREOUS ENAMELS AND PROCESS OF MAKING

Burnham W. King, Jr., Shaker Heights, and Lofton C. Baumhardt, Elyria, Ohio, assignors to The Harshaw Chemical Company, Cleveland, Ohio, a corporation of Ohio Application April 6, 1949, Serial No. 85,828

7 Claims. (Cl. 106—312)

This invention relates to opaquing agents for vitreous enamels. Such opaquing agents are of the type known as mill additions, being incorporated into vitreous enamels by milling with a frit and other usual ingredients of a mill batch. They are calcination products of a plurality of ingredients and are precalcined before being added to the mill batch.

In U. S. Patent No. 2,199,794 to Harshaw and Stillwell, there is described a class of opaquing agents containing oxides of calcium, antimony and titanium or zirconium, together with suitable fluorides, and calcination products thereof. In U. S. Patent No. 2,033,707 to Harshaw and Stillwell, similar compositions were described, however, not including fluorides. U. S. Patents 2,306,356 and 2,306,357 disclose further improvements in composition proportions and methods of manufacture of opaquing agents of the type indicated in the earlier patents referred to. It is to improvements in the type of opaquing agents disclosed in these prior patents that the present invention relates.

We have now discovered that certain advantages can be gained by adding a small proportion of silica or calcium silicate to compositions of the type indicated. Inasmuch as these materials are relatively cheap, it is obvious that any proportion thereof which can be used will represent a saving in cost of raw materials and, since the quality of the product is improved, the substitution is very attractive. Depending upon the degree of opacity required in the final enamel, the weight of the coating and the percentage of mill addition as well as other factors, a greater or less amount of silica can be tolerated. For some purposes as much as 10% or 12% can be used before the total reflectance becomes too low and the enamel becomes too hard. Based solely upon the factor of reflectance, the addition of silica would be justified only between 4% and 6%; but there are, surprisingly, other and quite important factors. We note that the silica makes possible a harder and shorter fire and results in an improvement in color best described as a shift toward the blue, that is, an elevation of the reflectance in the blue end of the spectrum sometimes accompanied by a depression in the red. This latter factor justifies the addition in some cases of the larger amounts up to 10% or 12%. A further important factor is the ability to use somewhat less pure raw materials without impairment of color.

Figure 1:
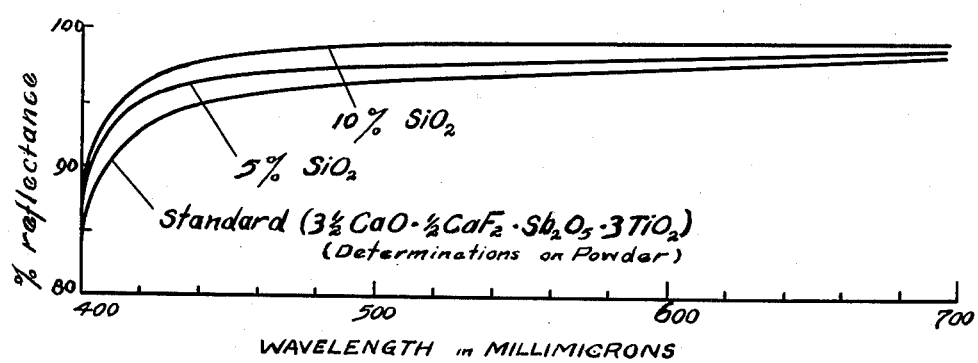
Figure 2:
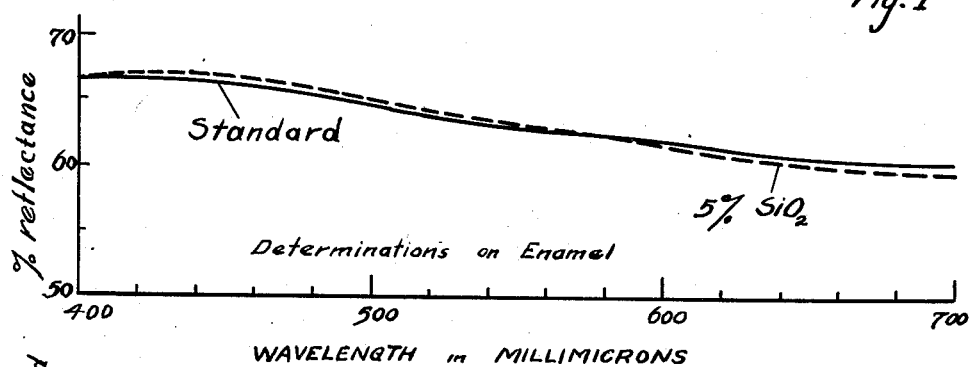
Figure 3:
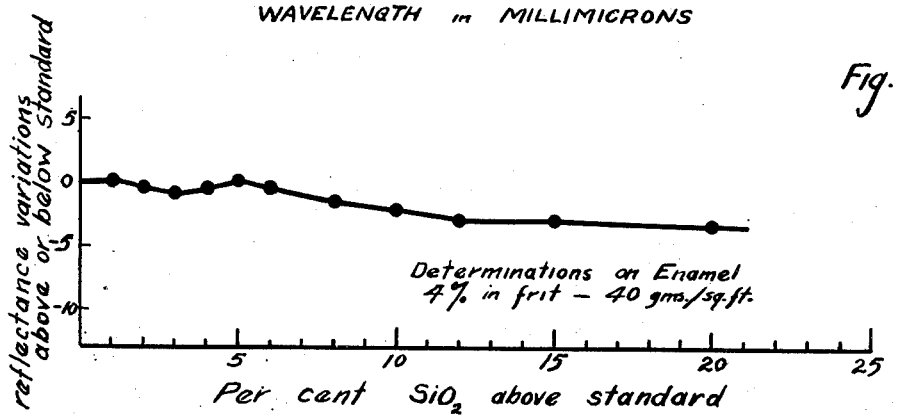
Figure 4:
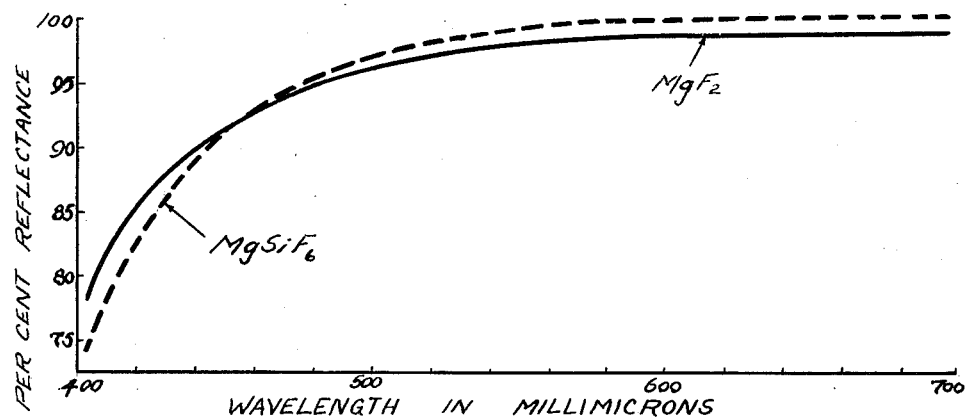
Figure 5:
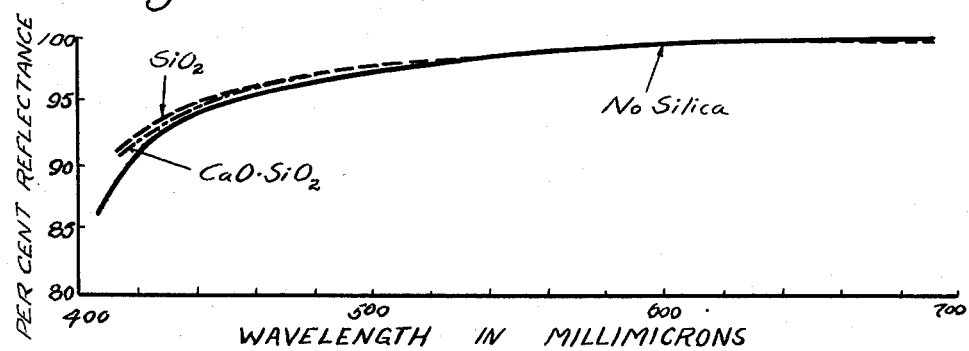
Figure 6:
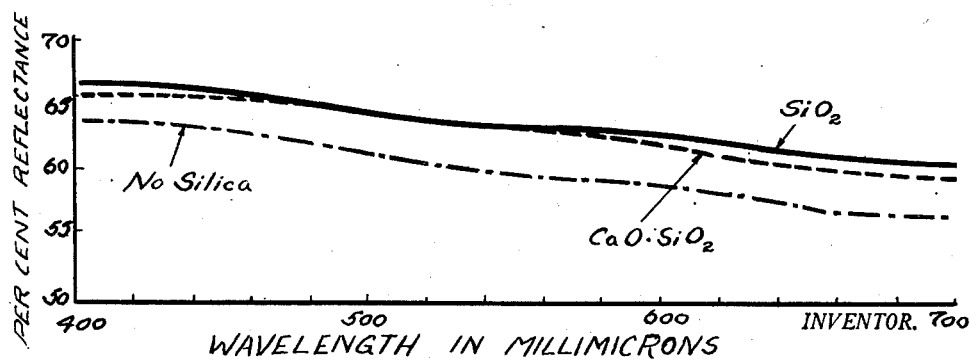

In the accompanying drawings, Fig. 1 is a diagram wherein are reproduced spectrophotometer charts (Hardy) of three representative compositions, in the form of powder, two of which are according to the invention and the other of which is called a standard composition, being the one which has been most commercialized heretofore; Fig. 2 is a similar diagram wherein are reproduced spectrophotometer charts of enameled sheet metal plaques opacified with the above described standard and one of the compositions according to the invention; Fig. 3 is a diagram wherein are plotted total reflectances against per cent silica added, the reflectance of the standard being taken as the zero value; Fig. 4 is a diagram wherein are reproduced spectrophotometer charts (on powder) of compositions one of which is the example from U. S. Patent 2,200,170, page 3, column 2, lines 35 to 40 and the other of which is identical except that for the $MgSiF_6$ there has been substituted the molecular equivalent of $MgF_2$; Fig. 5 is a similar diagram showing spectrophotometer charts (on powder) of compositions made under identical conditions except that one has no $SiO_2$, one has $SiO_2$ added as such and the other has $SiO_2$ added as $CaO.SiO_2$; and Fig. 6 is a diagram showing the results when the compositions of Fig. 5 are made up into enamel and applied on steel plaques.

The composition of the final product, on the analytical basis, may be as follows:

$Sb_2O_5$, 1 molecular weight.
CaO, 85 to 100 mol per cent } 3 to 5 molecular
$CaF_2$, 0 to 15 mol per cent } weights
$TiO_2$, 2½ to 3½ molecular weights.
(From ¼ to 1 molecular weight of $TiO_2$ may be replaced by a molecular equivalent $ZrSiO_4$ or $ZrO_2$.)
$SiO_2$, added as $SiO_2$, or $CaO.SiO_2$ { ½% to 12%, preferably 4% to 6% of the total weight of the other constituents.

Preferred compositions are as follows:

$Sb_2O_5$, 0.95 to 1.15 molecular weights.
CaO, 3.3 to 4.1 molecular weights.
$CaF_2$, 0.45 to 0.6 molecular weight.
$TiO_2$, 2.75 to 3.5 molecular weights.
(From 0.4 to 0.6 molecular weight of $TiO_2$ may be replaced by $ZrSiO_4$.)
$SiO_2$, ½% to 12% of the combined weights of the other ingredients.
It is preferred to use 4% to 6% $SiO_2$.

Various materials may be used as sources for the above constituents of the final product. We prefer to use $Sb_2O_3$, $Sb_2O_4$ or $Sb_2O_5$ as the source of antimony, CaO, Ca(OH)$_2$ or CaCO$_3$, as the source of lime, fluorspar or other CaF$_2$ as the source of fluorine, TiO$_2$ as such, and SiO$_2$ as such or as CaO.SiO$_2$. Such materials as will yield SiO$_2$, as such, under the conditions of calcination and without yielding harmful contaminants presumably could be used. We found, however, that MgSiF$_6$ did not give the desired result, whether because it does not yield SiO$_2$ or for what reason we do not know. The effect of SiO$_2$ in ZrSiO$_4$ is noticeably beneficial but only part of it seems to be effective, and since but little ZrSiO$_4$ is used in any formula, we neglect this source or merely use a little less SiO$_2$ or CaO.SiO$_2$ in the zircon-containing compositions. We have found that SiO$_2$ and CaO.SiO$_2$ are suitable sources of SiO$_2$. Since calcium silicate exists in various ratios of CaO and SiO$_2$, the CaO content should, when calcium silicate is used instead of SiO$_2$, replace an equal amount of Ca(OH)$_2$ or CaCO$_3$ and the SiO$_2$ content should replace an equal amount of SiO$_2$.

Examples I, II and III are suitable batch compositions; while Examples IV, V and VI are special comparisons illustrating the effect of the invention.

Example I

| | Parts by weight |
|---|---|
| CaCO$_3$ | 300 |
| Ca(OH)$_2$ | 37 |
| CaF$_2$ | 39 |
| Sb$_2$O$_3$ | 291 |
| TiO$_2$ | 240 |
| SiO$_2$ | 45 |

Example II

| | Parts by weight |
|---|---|
| CaCO$_3$ | 300 |
| Ca(OH)$_2$ | 37 |
| CaF$_2$ | 39 |
| Sb$_2$O$_3$ | 291 |
| TiO$_2$ | 240 |
| SiO$_2$ | 90 |

Example III

| | Parts by weight |
|---|---|
| CaCO$_3$ | 300 |
| Ca(OH)$_2$ | 37 |
| CaF$_2$ | 39 |
| Sb$_2$O$_3$ | 291 |
| TiO$_2$ | 200 |
| ZrSiO$_4$ (zircon) | 91 |
| SiO$_2$ | 67 |

Example IV

Two batches were made up in weight proportions as follows:

| | 1 | 2 |
|---|---|---|
| CaCO$_3$ | 100 | 100 |
| MgCO$_3$ | 168.6 | 168.6 |
| TiO$_2$ | 240.3 | 240.3 |
| Sb$_2$O$_3$ | 291.5 | 291.5 |
| MgSiF$_6$ | 80.0 | |
| HNO$_3$ (conc) | 80.0 | 80.0 |
| MgF$_2$ | | 30.0 |

It will be seen that batch 1 is the batch disclosed in U. S. Patent No. 2,200,170, page 2, column 2, lines 35 to 40, and that batch 2 is identical except that for MgSiF$_6$ there has been substituted its molecular equivalent of MgF$_2$. These batches were milled, Sb$_2$O$_3$ and HNO$_3$ being premixed, and fired side by side in saggers in an oxidizing atmosphere in the range of 1000° C. to 1150° C. furnace temperature for a period of 3½ hours, reaching a maximum of 1110° C. The batch temperature was between 1000° C. and 1110° C. for about 3 hours and above 1100° C. for about 1 hour. Spectrophotometer measurements were made on the resulting powder with the results shown in Fig. 4.

It can be seen that batch 2 is higher in the violet end of the spectrum and lower in the yellow and red than batch 1. Batch 2 thus has a bluer tint than batch 1. Both samples are low in the violet and are creamy, but batch 1 is definitely more yellowish than batch 2. Thus, the SiF$_4$ content of the MgSiF$_4$ was not effective to reduce the yellow component of the color.

Example V

Three batches were made up in weight proportions as follows:

| | 1 | 2 | 3 |
|---|---|---|---|
| CaCO$_3$ | 300 (3.0) | 300 (3.0) | 225 (2.25) |
| TiO$_2$ | 240 (3.0) | 240 (3.0) | 240 (3.0) |
| Sb$_2$O$_3$ | 291.5 (1.0) | 291.5 (1.0) | 291.5 (1.0) |
| Ca(OH)$_2$ | 37 (0.5) | 37 (0.5) | 37 (0.5) |
| CaF$_2$ | 39 (0.5) | 39 (0.5) | 39 (0.5) |
| SiO$_2$ | | 45 (0.75) | |
| CaO.SiO$_2$ | | | 87.5 (0.75) |
| SiO$_2$ content | 0 | 45 | 45 |
| Per cent SiO$_2$ by weight | 0 | 4.7 | 4.9 |

Numbers in parentheses in the above table are the molecular proportions, each indicating the number of molecular weights represented by the numbers under which they appear. Other numbers are parts by weight. These batches were calcined under similar conditions to those described under Example IV. Spectrophotometric curves were run on the resulting powders with the results shown in Fig. 5.

It will be seen that batch 2 is identical with batch 1 with the exception that 45 grams of SiO$_2$ have been added. Batch 3 is identical with batch 1 with the exception the 87.5 grams (0.75 mol) of CaO.SiO$_2$ have been added and the CaCO$_3$ content has been reduced by 0.75 mol. The SiO$_2$ content of the CaO.SiO$_2$ is 45 grams as in batch 2.

Example VI

The batches of Example V were made into enamel slips, using the same frit and all other factors being identical as far as possible. The slips were applied to steel plaques and fired. Spectrophotometer charts were taken from the resulting enameled plaques and with the results shown in Fig. 6.

In the practice of the invention, calcination is carried out at a temperature preferably from 1000° C. to 1200° C., batch temperature, in an oxidizing atmosphere. The time required varies according to the temperature and other conditions, particularly the size of the batch, larger batches requiring longer time. The reflectance is nearly fully developed by 1½ hours firing at 1150° C., whereas three to five or more hours are preferred at 1000° C. While other conditions may be used successfully, we prefer to fire for three to six hours or longer at from 1000° C. to 1150° C. or 1½ to 3 hours or longer at 1100° C. to 1200° C. The operator will adjust his firing time and firing temperatures to his conditions so as to complete the firing as quickly as he can without sintering the product, although longer firing does no harm.

It will be understood that, consistent with the foregoing statements concerning suitable batch temperatures, in plant practice the firing cycle includes a period for bringing the temperature up to the desired firing range, a period in the desired range and a cooling down period. Preferred plant practice for the silica-free product was 6 hours at a temperature below 1000° C., 6 hours above 1000° C. reaching a maximum of 1100° C. and 7 hours below 1000° C. down to the end of the cycle at 40° C. The current preferred practice, using silica in the formula is a firing cycle requiring 4 hours heating below 1000° C., 4½ hours above 1000° C. reaching a maximum of 1150° C. and 5 hours cooling from 1000° C. down to the end of the firing cycle of 40° C. It will thus be seen that the preferred firing cycle has been reduced from about 19 hours to about 13½ hours, the quality of the product not being reduced by the harder firing but actually being improved thereby. In each case the plant practice has been to fire as hard as could be done safely, that is, without danger of sintering. By hard firing we do not mean that the maximum temperature is increased but that the increase in furnace and consequently batch temperature is more rapid in the early stages so that maximum temperature is attained earlier in the cycle. The above comparative firing cycles from plant practice are stated in terms of kiln temperatures (tunnel kiln) and it will be understood that batch temperatures lag somewhat behind kiln temperatures.

The above described compositions which contain $SiO_2$ added as such or as $CaO.SiO_2$ are suitable for use as mill additions and preferably are incorporated into enamel slips at 2% to 10% and usually at 4% to 6% at the mill. The composition of Example III is most suitable for use with zirconium-containing frits.

By reference to Fig. 2 it will be seen that the composition disclosed in Example I, omitting all $SiO_2$, has the color indicated by the heavy line while the composition of Example I as set forth without any omission has the color indicated by the dotted line. It will be noted that the composition to which silica has been added is relatively high in the blue and less high in the red. Numerous samples have been run and this change in slope or increase in blueness was found to be characteristic from ½% to 12% and even higher although the higher values were not investigated to any substantial extent because of the hardness of the resulting enamels. In Figs. 4 and 5 we have shown spectrophotometer charts taken on the powders rather than on enamels. These views show the increase in blueness. The increase in opacity shown in Fig. 1 follows approximately the trend indicated in Fig. 3. It should be explained that the points shown in Fig. 3 are averages of about 10 determinations per batch and on from two to seven batches. The reflectances are variable from batch to batch because of the difficulty in obtaining uniform calcining conditions on the various samples and a number of other lesser factors such as variability of raw materials, application, weight, etc. Individual variations up to about 1% in total reflectance were encountered in the range from 1 to 5% $SiO_2$ and up to about three per cent in the higher ranges up to 20% $SiO_2$. This variability is illustrated by the table below which contains the data upon which Fig. 3 is based.

| Batch | 1 | 2 | 3 | 4 | 5 | 6 | 7 | 8 | Av. |
|---|---|---|---|---|---|---|---|---|---|
| 1% | +.4 | −.1 | −.2 | | | | +.3 | | +.1 |
| 2% | +.2 | −.6 | −.6 | −.7 | | | | | −.4 |
| 3% | −.4 | −.8 | −.8 | −1.0 | | | | | −.7 |
| 4% | −.0 | −.3 | −.7 | −.8 | | | | | −.45 |
| 5% | +.2 | −.0 | −.0 | +.1 | −.2 | +.4 | +.5 | | +.14 |
| 6% | | | | −.2 | | | | −.7 | −.45 |
| 8% | | | | −.2 | | | | −2.2 | −1.2 |
| 10% | | | | | | | −.7 | −3.7 | −2.2 |
| 12% | | | | | | | −1.7 | −3.9 | −2.8 |
| 15% | | | | | | | −1.6 | −4.0 | −2.8 |
| 20% | | | | | | | −1.7 | −4.5 | −3.1 |

Notwithstanding the variability exhibited by the samples upon which the table is based, there is a consistent dip at 3%, a consistent maximum at 5% and a downward trend from about five per cent to 20%. Spectrophotometer curves were run on most of the plaques upon which the table is based and they consistently show the shift of the color toward the blue. The shift is consistently of the order shown in the drawings.

By the expression "theoretical composition" as used in the claim, we mean the composition which should be found on analysis, based upon the assumption that $CaCO_3$ and $Ca(OH)_2$ break down completely to CaO and volatile $CO_2$ and $H_2O$; that $CaF_2$ remains unchanged, that $TiO_2$ and $ZrSiO_4$ remain unchanged if present in the batch; that $Sb_2O_3$ and $Sb_2O_4$ are oxidized to $Sb_2O_5$; that $CaO.SiO_2$ either breaks down to CaO and $SiO_2$ or remains unchanged. The use of this expression is not intended to define the state of association of the component oxides. Reactions may and probably do take place, and some of the material may be in a state of solid solution.

This application is a continuation-in-part of our copending application Serial No. 759,226, filed July 5, 1947, now abandoned, which was a continuation-in-part of our application Serial No. 722,741, filed January 17, 1947, now abandoned.

Having thus described our invention, what we claim is:

1. A new composition of matter suitable for use as a mill addition opacifier for vitreous enamels, the same being the product of calcining under oxidizing conditions an antimony compound of the class consisting of $Sb_2O_3$, $Sb_2O_4$ and $Sb_2O_5$, a calcium compound of the class consisting of CaO, $Ca(OH)_2$ and $CaCO_3$, $CaF_2$, $TiO_2$ and a silicon compound of the class consisting of $SiO_2$ calcium silicate, said compounds being employed in proportions to yield a calcination product of theoretical composition as follows:

$Sb_2O_5$, 1 molecular weight,
CaO, 85 to 100 mol per cent ⎫
⎬ 3 to 5 molecular weights,
$CaF_2$, up to 15 mol per cent ⎭
$TiO_2$, 2½ to 3½ molecular weights,
$SiO_2$, ½% to 12% of the other components by weight.

2. A new composition of matter suitable for use as a mill addition opacifier for vitreous enamels, the same being the product of calcining under oxidizing conditions an antimony compound of the class consisting of $Sb_2O_3$, $Sb_2O_4$ and $Sb_2O_5$, a calcium compound of the class consisting of CaO, $Ca(OH)_2$ and $CaCO_3$, $CaF_2$, $TiO_2$ and a silicon compound of the class consisting of $SiO_2$ and calcium silicate, said compounds being employed in proportions to yield a calcination product of theoretical composition as follows:

$Sb_2O_5$, 0.95 to 1.15 molecular weights,
CaO, 3.3 to 4.1 molecular weights,
$CaF_2$, 0.45 to 0.6 molecular weight,
$TiO_2$, 2.75 to 3.5 molecular weights,
$SiO_2$, 4% to 6% of the other components by weight.

3. The composition as defined in claim 2 wherein from 0.4 to 0.6 molecular weight of $TiO_2$ is replaced by the molecular equivalent of a compound of the class consisting of $ZrO_2$ and $ZrSiO_4$.

4. A process for the production of a new composition of matter suitable for use as a mill addition opacifier for vitreous enamels comprising calcining under oxidizing conditions in the temperature range from 1000° C. to 1200° C. for from 1½ to 6 hours an antimony compound of the class consisting of $Sb_2O_3$, $Sb_2O_4$ and $Sb_2O_5$, a calcium compound of the class consisting of CaO, $Ca(OH)_2$ and $CaCO_3$, $CaF_2$, $TiO_2$ and a silicon compound of the class consisting of $SiO_2$ and calcium silicate, said compounds being employed in proportions to yield a calcination product of theoretical composition as follows:

$Sb_2O_5$, 1 molecular weight,
CaO, 85 to 100 mol per cent ⎫
⎬ 3 to 5 molecular weights,
$CaF_2$, up to 15 mol per cent ⎭
$TiO_2$, 2½ to 3½ molecular weights,
$SiO_2$, ½% to 12% of the other components by weight.

5. A process for the production of a new composition of matter suitable for use as a mill addition opacifier for vitreous enamels comprising calcining under oxidizing conditions in the temperature range from 1000° C. to 1200° C for from 1½ to 6 hours an antimony compound of the class consisting of $Sb_2O_3$, $Sb_2O_4$ and $Sb_2O_5$, a calcium compound of the class consisting of CaO, $Ca(OH)_2$ and $CaCO_3$, $CaF_2$, $TiO_2$ and a silicon compound of the class consisting of $SiO_2$ and calcium silicate, said compounds being employed in proportions to yield a calcination product of theoretical composition as follows:

$Sb_2O_5$, 0.95 to 1.15 molecular weights,
CaO, 3.3 to 4.1 molecular weights,
$CaF_2$, 0.45 to 0.6 molecular weight,
$TiO_2$, 2.75 to 3.5 molecular weights,
$SiO_2$, 4% to 6% of the other components by weight.

6. The process as defined in claim 4 wherein from 0.25 to 1.0 molecular weight of $TiO_2$ is replaced by the molecular equivalent of a compound of the class consisting of $ZrO_2$ and $ZrSiO_4$.

7. The process as defined in claim 5 wherein from 0.4 to 0.6 molecular weight of $TiO_2$ is replaced by the molecular equivalent of a compound of the class consisting of $ZrO_2$ and $ZrSiO_4$.

BURNHAM W. KING, JR.
LOFTON C. BAUMHARDT.

No references cited.